US006276817B1

United States Patent
Inui (10) Patent No.: US 6,276,817 B1
(45) Date of Patent: Aug. 21, 2001

(54) DISCONTINUOUS LIGHT-BEAM CONDENSER LENS

(75) Inventor: Masanobu Inui, Kyoto (JP)

(73) Assignee: Yoshiteru Sogawa, Shiga (JP); a part interest ( * ) Notice: Subject to any disclaimer, the term of this patent is extended or adjusted under 35 U.S.C. 154(b) by 0 days.

(21) Appl. No.: 09/505,759

(22) Filed: Feb. 16, 2000

(30) Foreign Application Priority Data

Mar. 1, 1999 (JP) ................................................. 11-052351

(51) Int. Cl.[7] ........................................................ F21V 5/00
(52) U.S. Cl. ............................................ 362/331; 359/742
(58) Field of Search .................................... 362/331, 326, 362/336, 335, 332; 359/742, 592, 741, 743, 625, 626

(56) References Cited

U.S. PATENT DOCUMENTS 5,151,826 * 9/1992 Pasco ..................................... 359/742

FOREIGN PATENT DOCUMENTS 62-225851    10/1987   (JP) .

* cited by examiner

Primary Examiner—Sandra O'Shea
Assistant Examiner—Hargobind S. Sawhney
(74) Attorney, Agent, or Firm—Milde, Hoffberg & Macklin, LLP (57) ABSTRACT

A discontinuous light-beam condenser lens which features excellent light-beam permeability and little loss of solar energy, and can precisely condense incident light beams onto a condensing line, and is formed by a combination of a plurality of lens segments, each of which comprises a stair-like incident-light surface and a refractive surface functioning as a condensing curved surface being so formed that light beams passed through the refractive surface are condensed as refractive light beams onto a single line when parallel light beams are incident from incident-light surface.

3 Claims, 9 Drawing Sheets

DISCONTINUOUS LIGHT-BEAM CONDENSER LENS

BACKGROUND OF THE INVENTION

1. Field of the Invention

The present invention relates to a condenser lens having a novel structure, more particularly, the invention relates to a discontinuous light-beam condenser lens which can be ideally used for a solar-beam condensing furnace and the like.

2. Description of Related Art

In the field of solar-beam condensing furnace for extracting light energy by condensing solar beams, a variety types such as reflection type or direct permeating type have been used.

A solar-beam-reflection-type furnace making use of a reflection mirror does not only generate much loss of solar energy, but it is also difficult to conduct work on conversing line of solar energy and to control sun-following, and yet, there have been such problems that the furnace itself become larger and a huge amount of capital spending is required.

There have been various methods for utilizing solar beams by condensing solar beams onto a single line with the use of an optical lens. However, in such conventional methods with the use of a convex lens, since the convex lens itself has upper-lower symmetrical convex curve surfaces from its structural viewpoint, it has caused a high reflection factor against incident light, and has worsened efficiency of incident-light permeability. In addition, the condensed beams are varied widely so as not to be condensed onto a single line. Further, a convex lens used in such conventional methods had to be large to receive solar beams in a wide range and its center portion was thicker than the other portions, it did not have enough strength to be practically used.

In order to solve the above problems, the Japanese Laid-Open Patent Publication No. 62-225851 (1987) discloses a condenser unit comprising a plurality of thin fan-shaped convex lenses combined concentrically to each other with flat light-incident surfaces having a minimum reflection factor. However, the above condenser unit was not capable of condensing solar beams onto a single line, but it was merely a convex-lens-applied condenser unit.

SUMMARY OF THE INVENTION

As a result of our researches to solve the above problems, the inventor of the present invention eventually achieved a novel discontinuous light-beam condenser lens featuring excellent light-beam permeability and little loss of solar energy, which is easy to be manufactured even if it is large-scale one, and which can precisely condense incident light beams onto a condensing line. It should be understood that the term "condensing line" does not represent a conventional focal line, but it is "a line" determined by calculation based on the "law of crossed light".

An object of the present invention is to provide a novel discontinuous light-beam condenser lens formed by a combination of a plurality of lens segments, each of which comprises: a stair-like incident-light surface; and a refractive surface functioning as a condensing curved surface, which is so formed that light beams passed through the refractive surface are condensed as refractive light beams onto a single line when parallel light beams are incident from incident-light surface.

To achieve the above object, the discontinuous light-beam condenser lens according to the present invention is formed by a combination of a plurality of lens segments, each of which comprises: a stair-like incident-light surface; and a refractive surface functioning as a condensing curved surface, which is so formed that light beams passed through the refractive surface are condensed onto a single line.

Further, a discontinuous light-beam condenser lens according to the present invention is so arranged that they can condense light beams onto a single line and is formed by a combination of a plurality of lens segments, each of which comprises; a stair-like incident-light surface; and a refractive surface functioning as a condensing curved surface, which is so formed that light beams passed through the refractive surface are condensed onto the single line.

Still further, in the discontinuous condenser lens according to the present invention, above-described lens segments are discontinuously linked together to form one plane.

As described above, since a discontinuous light-beam condenser lens of the present invention is formed by precisely combining a plurality of lens segments, each of which comprises a stair-like incident-light surface as a flat surface and a refractive surface as a condensing curved surface, it features excellent incident light-beam permeability and little loss of solar energy and thus makes it possible to condense light beams in a linear form and also in rectangular form. Further, by using the discontinuous light-beam condenser lens of the present invention, it is possible to produce a large-scale condenser unit having a function of following up the movement of the sun, which has been considered to be impossible, and to materialize a condenser unit free from obstruction caused by wind pressure, rainwater, flying birds, and so on.

BRIEF DESCRIPTION OF THE DRAWINGS

In the accompanying drawings.

DESCRIPTION OF THE PREFERRED EMBODIMENTS

Embodiments of the present invention will hereinafter be described with reference to the accompanying drawings.

Figure 5:
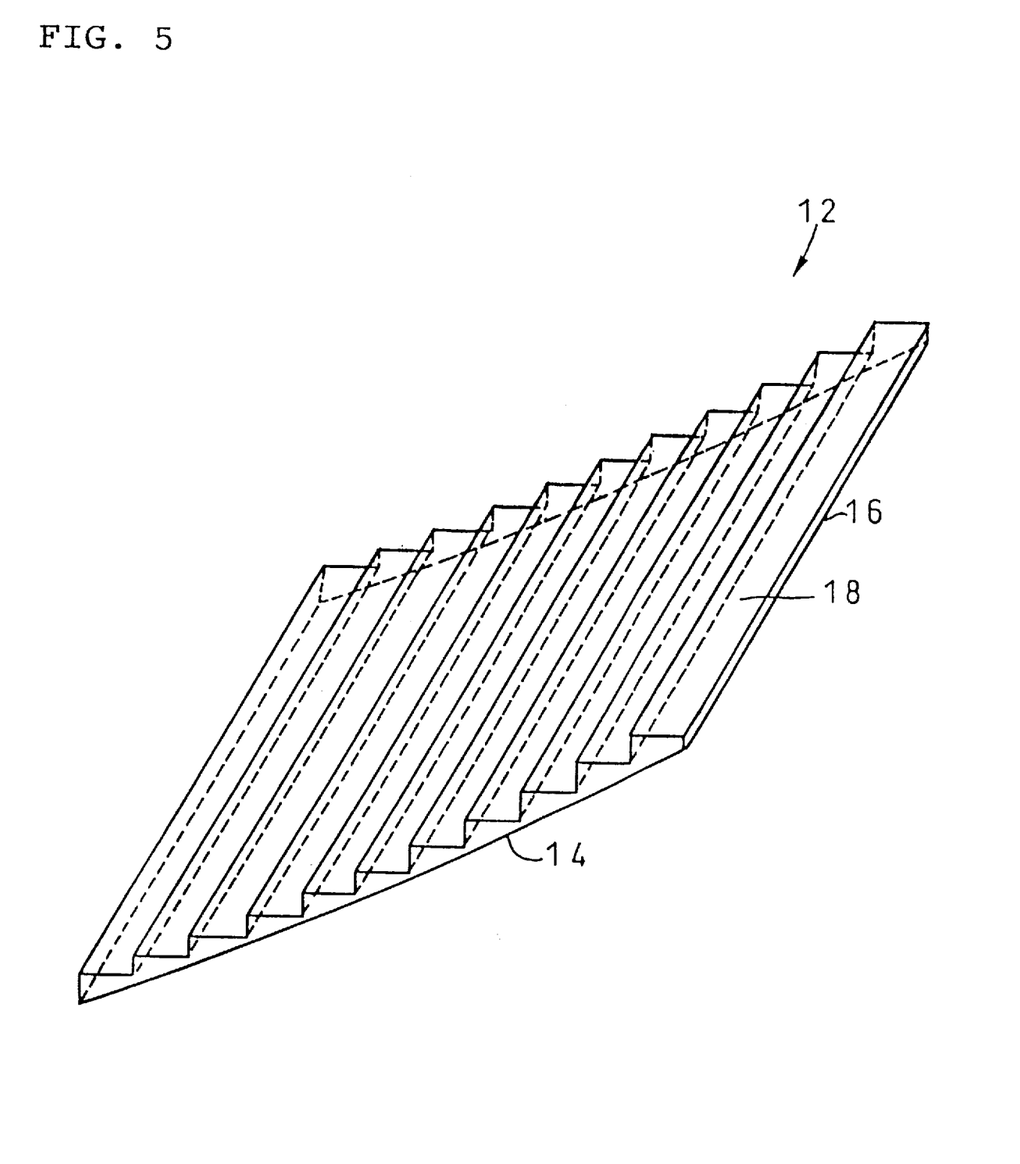
FIG. 5 is a perspective view of an embodiment of one of lens segments comprising the discontinuous light-beam condenser lens according to the present invention.

A lens segment 12, a plurality of which compose a discontinuous light-beam condenser lens according to the present invention, is described below with reference to FIG. 5.

A refractive surface 14 of the lens segment 12 is formed by part of cylindrical configuration having a predetermined curvature calculated by the "law of the crossed light". The lens segment 12 comprises the refractive surface 14 functioning as a condensing curved surface 16, and a stair-like incident-light surface 18.

Figure 6:
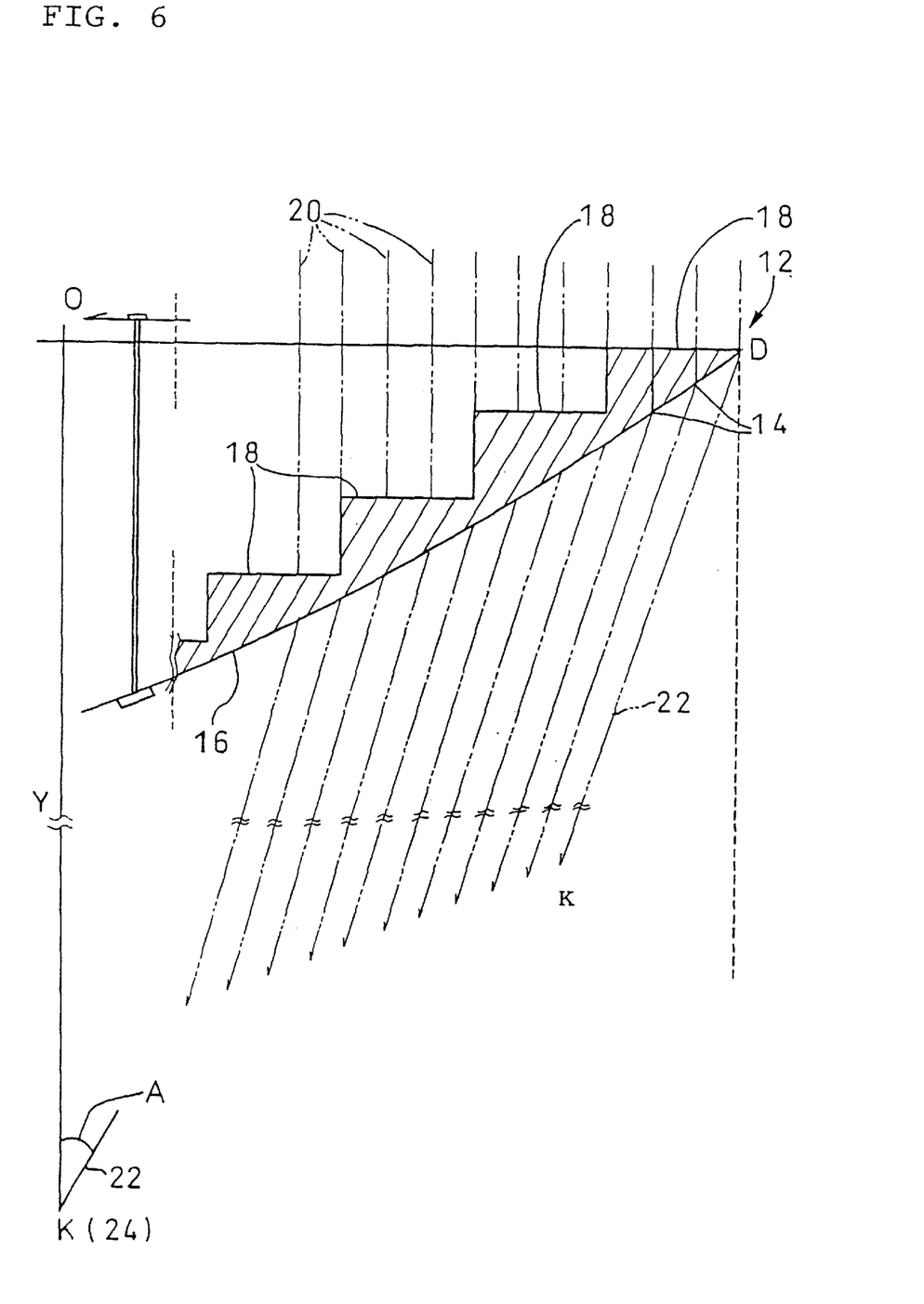
FIG. 6 is a partially enlarged cross-sectional view of an embodiment of the discontinuous light-beam condenser lens according to the present invention.

With reference to FIG. 6, the mechanism of the discontinuous light-beam condenser lens comprising a plurality of the lens segments 12 according to the present invention is described below. When parallel light beams 20 pass through the stair-like incident-light surface 18 of the lens segment 12, the parallel light beams 20 straightforwardly permeate through the lens to the refracting lens surface 14 with little reflectance, because its incident angle is perpendicular to the incident-light surface 18 of the lens segment 12. And, since the parallel light beams 20 arrive at the refractive surface 14 functioning as the condensing curved surface 16, refracted light beams 22 emerging from the refracting surface 14 are condensed onto a calculated condensing line K24 (a single line).

The above mechanism is more fully described below. Based on the incident-light surface 18, an angle of a gradient curved surface of the refractive surface 14 satisfying the following equations (1) to (3) is defined, whereby the angle of the condensing curved surface 16 of the discontinuous light-beam condenser lens of the present invention is determined.

Figure 7:
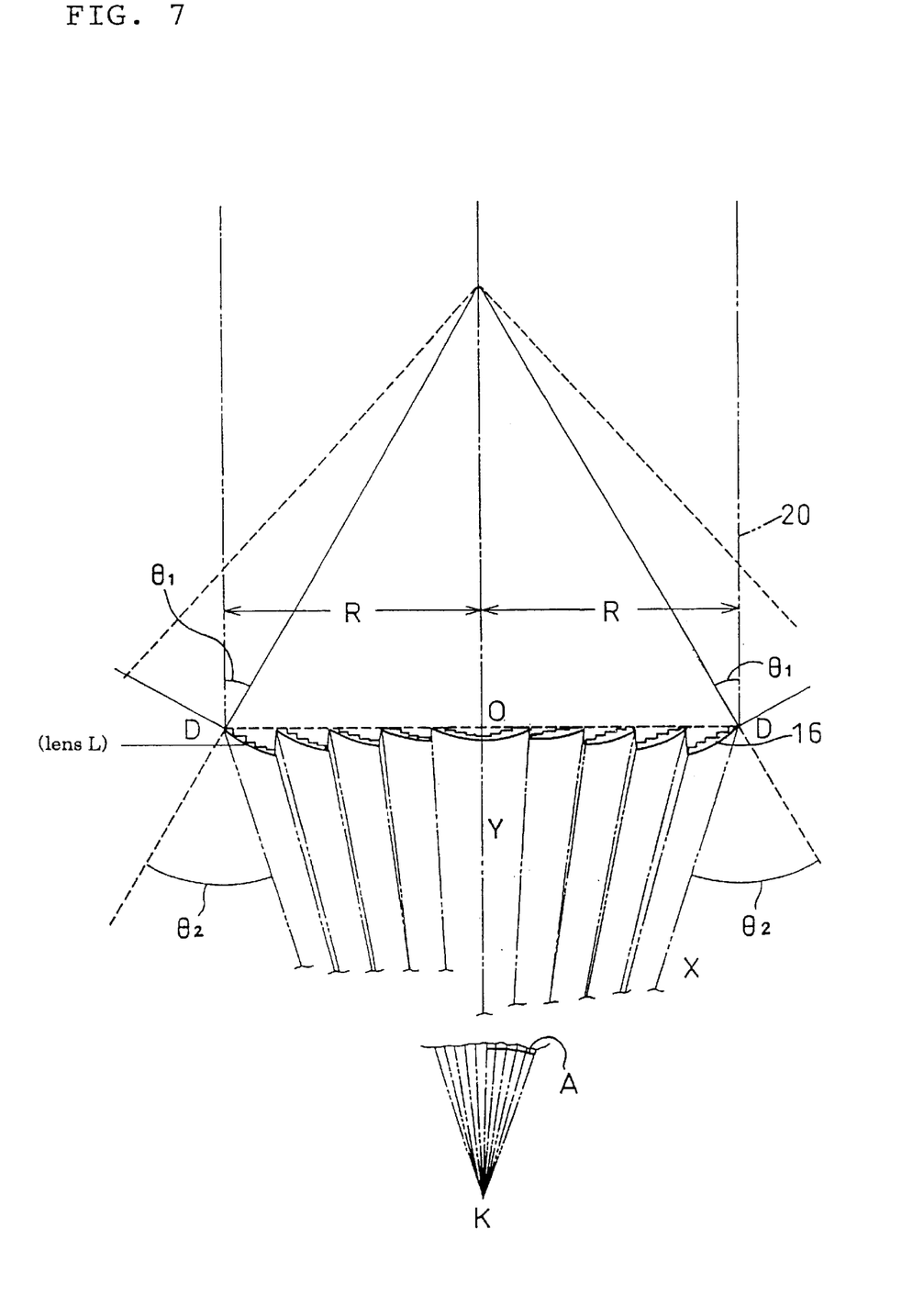
FIG. 7 is a cross-sectional view of an embodiment of the discontinuous light-beam condenser lens according to the present invention.

FIG. 7 is a cross-sectional view of the discontinuous light-beam condenser lens 10 according to the present invention comprising the above-referred plural lens segments 12. In FIG. 7, Y is a center line of this discontinuous light-beam condenser 10, which is drawn perpendicular to the incident-light surface 18, O is an intersection of a center line Y and a horizontal line R intersecting at right angles, and A is an angle which center line Y forms with line X that links a point D and a condensing line K.

Assuming that the distance between the point O and the point D is R and the distance between the point O and the condensing line K is Y, the following relationship can be established between the distance R, the center axis Y, and the angle A:

$$A = \tan^{-1}(R/Y) \quad (1)$$

FIG. 7 is an explanatory view for determining an angle of refracted light X of the condensing curved surfaces at an arbitrary point D on the refracting surfaces x. It is well known that the following relationship can be established according to the Snell's law, assuming that refractive indexes of transparent mediums (i.e. the lens and air in this case) are $N_1$ and $N_2$, an incident angle is $\theta_1$, and a refractive angle is $\theta_2$.

$$N_1 \sin \theta_1 = N_2 \sin \theta_2$$

Assuming that the lens is made of acrylic resin (paraglass), the lens has a refractive index of $N_1=1.49$. When an aerial refractive index of $N_2=1$ is applied to an arbitrary point D, the following equation (2) is established:

$$1.49 \sin \theta_1 = \sin \theta_2 \quad (2)$$

With geometrical-optical analysis, the following relationship can be established at an arbitrary point D on the condensing curved surface 16 (corresponding to the refracting surface x):

$$\theta_2 - \theta_1 = A \text{(Pythagoras)} \quad (3)$$

The above simultaneous equations (1), (2), and (3), are referred to as "condensing equations" in this specification.

$\theta_1$ should be less than a critical angle of full reflection thereof, although it depends on the refractive indexes of the medium and the lens.

Unlike a conventional convex lens, the refractive condensing curved surface of the discontinuous light-beam condenser lens according to the present invention is formed with gradient curved surface satisfying "multiple simultaneous equations based on the law of crossed light beams".

The above-referred "multiple simultaneous equations based on the law of crossed light beams" are described below:

(Multiple simultaneous equations)

1. $\sin \theta_1$(approximate algebra)$\times N_1/N_2 \cdot \sin^{-1} = \theta_2$ (calculated numerical value)

2. $\theta_2$(calculated numerical value)–Pythagoras A(R/Y $\tan^{-1}$)=$\theta_1$(calculated numerical value)

3. $\theta_1$(approximate algebra)–$\theta_1$(calculated numerical value)=±(the remainder)

4. $\sin\pm$(the remainder)$\times N_2/N_1 \cdot \sin^{-1} = \pm$(calculated remainder)

5. ±(calculated remainder)+$\theta_1$(approximate algebra)=$\theta_1$ (re-approximate algebra)

The above equations are subject to coil-like continuous calculation (loop-calculation).

*$\theta_1$(threefold approximate algebra)–$\theta_1$(numerical values via threefold calculation)=0

Accordingly, $\theta_1$=OK for generating a four-dimensional unified-phase symmetrical angle is established.

The above equations give an explanation that since all the light beams which are let out from the incident-light surface and let in the condensing surface from the direction perpendicular thereto include few reflective components except the ones absorbed in the lens according to the optical theory, almost all of the light beams are focused on a single line along optical paths having the refractive angle which satisfies the Snell's Law. In the embodiments of the present invention, refracted light beams converge to a single condensing line.

Figure 1:
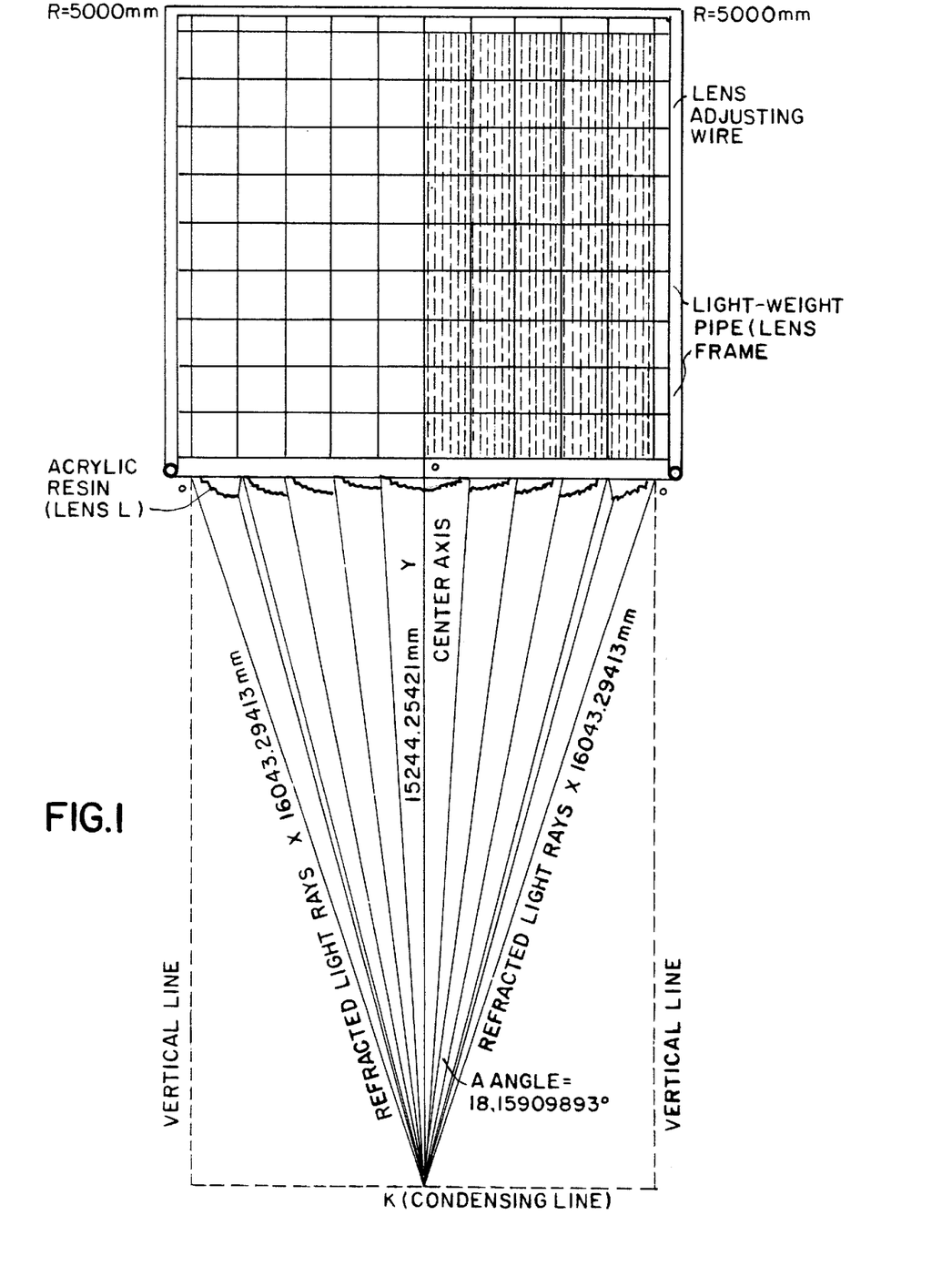
FIG. 1 is a cross-sectional view and a flat view of an embodiment of the discontinuous light-beam condenser lens according to the present invention.
Figure 2:
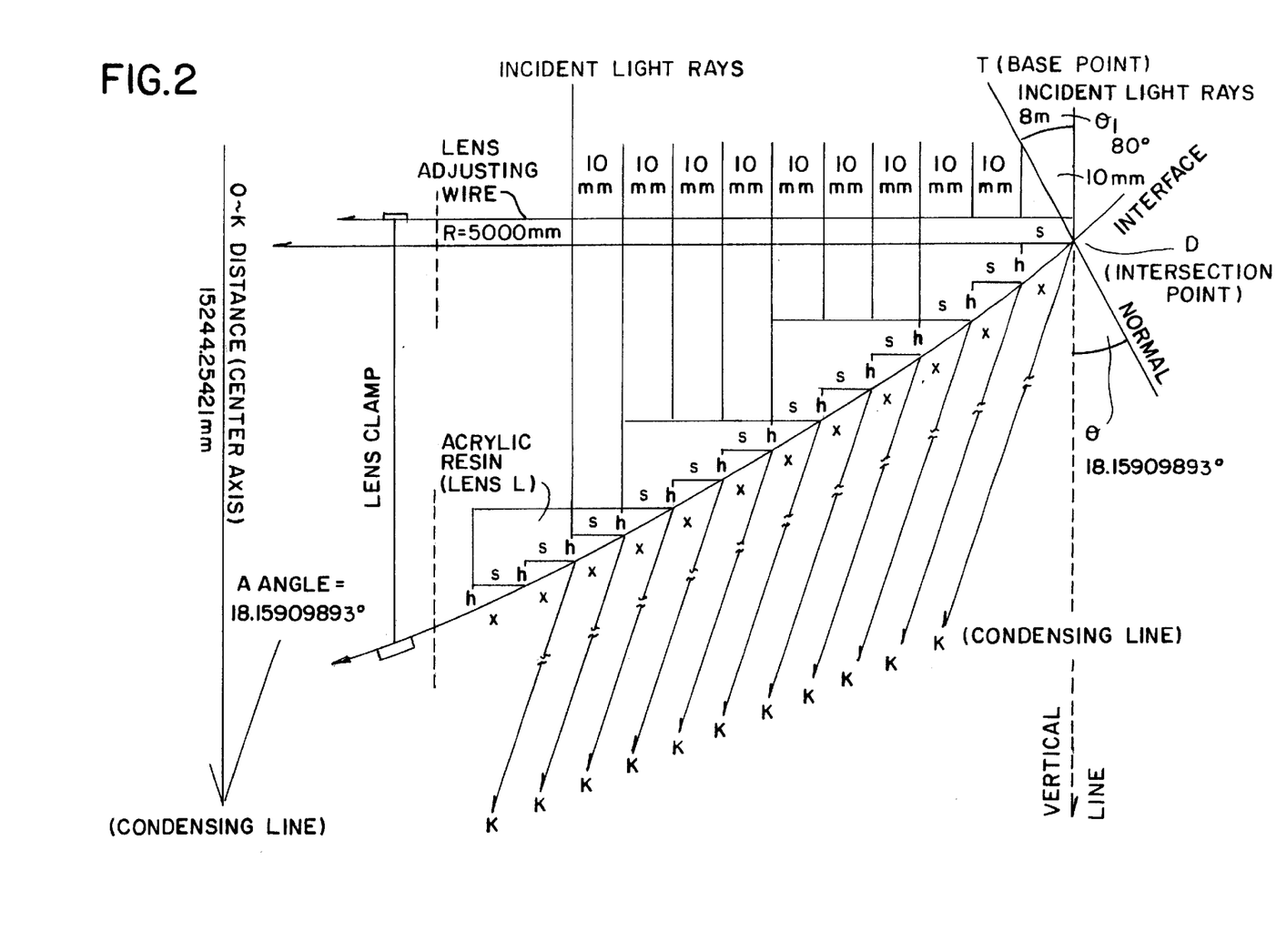
FIG. 2 is a partial cross-sectional view of an embodiment of the discontinuous light-beam condenser lens according to the present invention.
Figure 3:
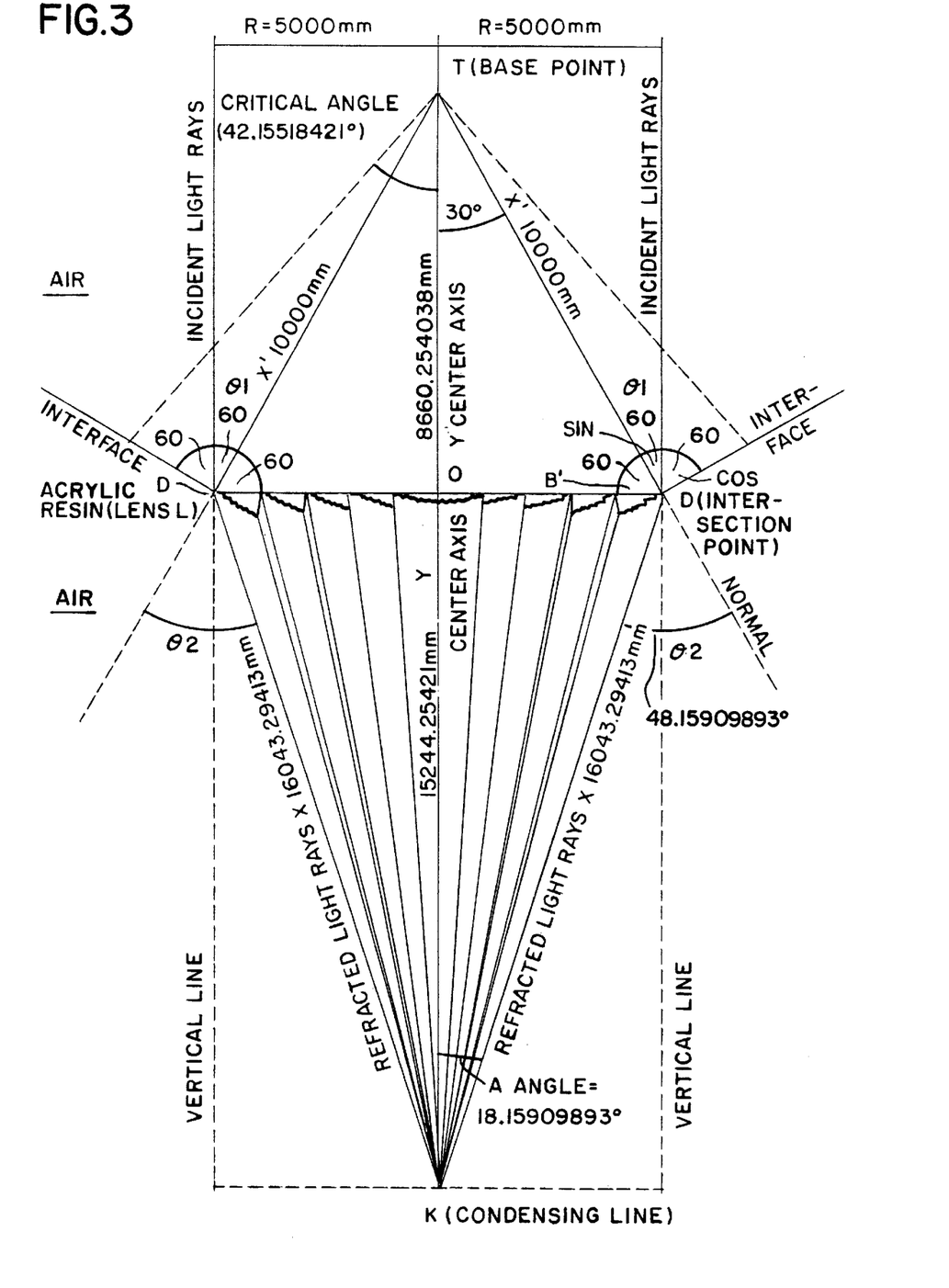
FIG. 3 is a basic schematic diagram of an embodiment of the discontinuous light-beam condenser lens according to the present invention.
Figure 4:
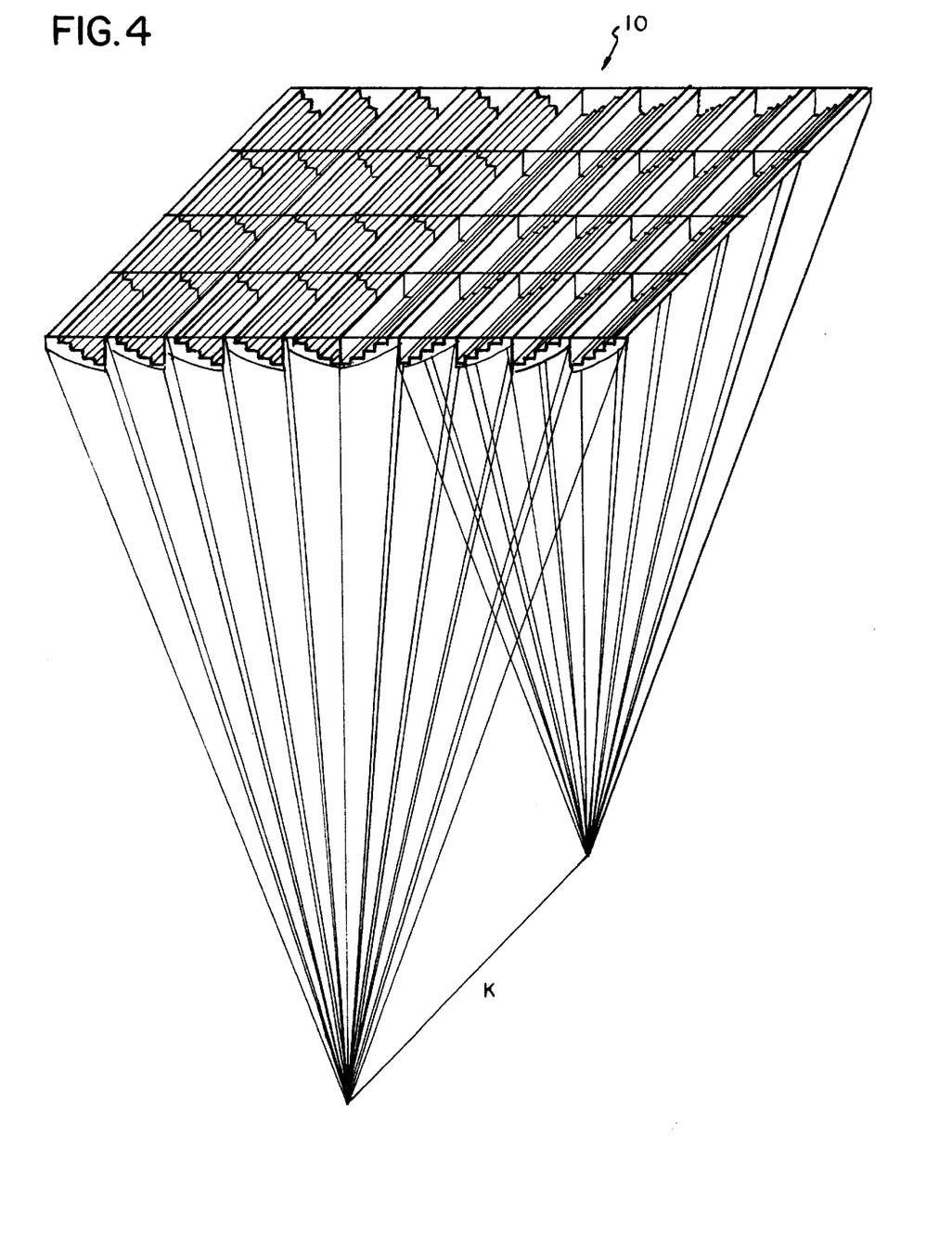
FIG. 4 is a perspective view of an embodiment of the discontinuous light-beam condenser lens 10 according to the present invention.
Figure 8:
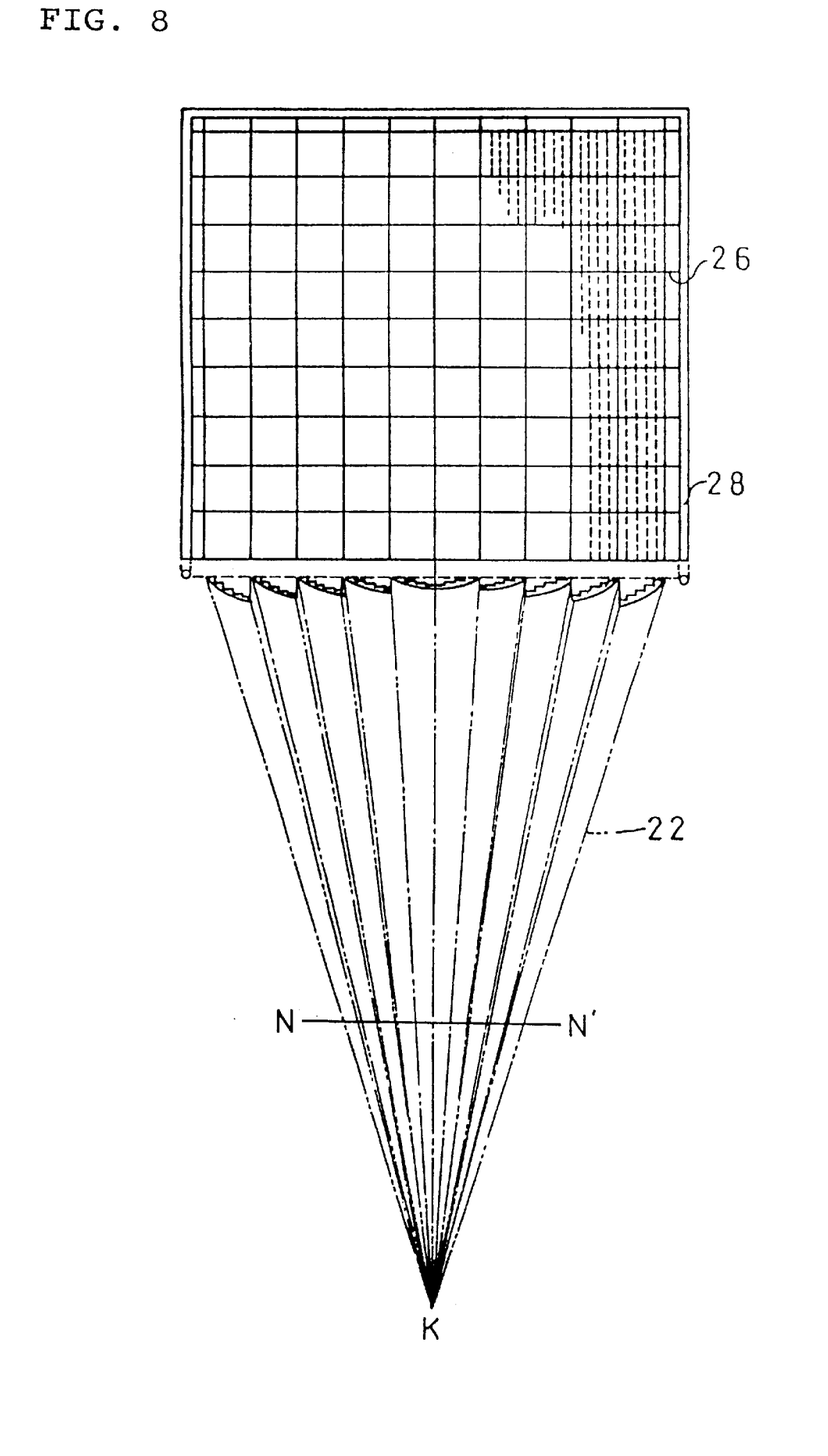
FIG. 8 is a cross-sectional view and a flat view of an embodiment of the discontinuous light-beam condenser lens according to the present invention.

FIG. 4 is a perspective view of the discontinuous light-beam condenser lens according to an embodiment of the present invention. FIG. 8 is a cross-sectional view and a flat view of the discontinuous light-beam condenser lens according to the present invention.

In the discontinuous light-beam condenser lens L, the incident-light surface 18 is formed into a stair-like shape and the refractive surface 14 functions as the condensing curved surface 16. Based on the condensing surface 16 and the incident-light surface 18 as the reference, the lens segments having gradient curved surface formed by angles satisfying the above-described multiple simultaneous equations are disposed in this discontinuous light-beam condenser lens L. The discontinuous light-beam condenser lens of the present invention shown in FIG. 4 and FIG. 8 condenses light beams refracted via plural lens segments onto a single line, while respective lens segments condense light beams onto a single line by combination of a plurality of lens segments. In such a case that a plurality of lens segments condense light beams onto a single line, extremely high degree of heat and intense rays of light can be generated on the condensing line. Arbitrary temperature and illumination can be secured according to the incident-light area and condensing position area of the lens, the number of lens segments, and a method of combining them.

Materials suitable for lens segments composing the discontinuous light-beam condenser lens according to the present invention are not particularly limited, as long as they have excellent light transmittance and transparency, light weight, and high mechanical strength. However, acrylic resin, which has the above properties and excellent workability, can be preferably used.

A fundamental requirement for the discontinuous light-beam condenser lens according to the present invention is that refracted light beams passing through the lens segments condensed at least onto a single line. Each of the lens segments may not always make contact with or be bonded with adjoining lens segments. Discontinuity on the level surface provides space between respective lens segments. In particular, discontinuity on the level surface avoids a variety of environmental problems that arise when the condenser unit is installed outdoors. Concretely, the space between the outdoor lens segments may act as a ventilation passage to avoid wind pressure, and moreover, since rainwater flows through the space between the lens segments, there are not accumulated inside of the lens. Further, since birds can fly through the space, there is no fear that birds collide with the lens.

In order to hold the space between the lens segments, it is necessary that means for fixing the position of individual lens segment may be so provided that they can condense light beams at a predetermined distance. Concretely, as shown in FIG. 8 for example, the lens segments and the discontinuous condenser lens are fixed by providing means 26 for being linked to respective lens segment and supporting means 28 for supporting the discontinuous light-beam condenser lens comprising a plurality of lens segments being linked with each other. In this case, an angle of refracted surface is set according to distance from the condensing line, and then, based on the design in accordance with the angles, the condensing curved surface of individual lens segments is formed.

Figure 9:
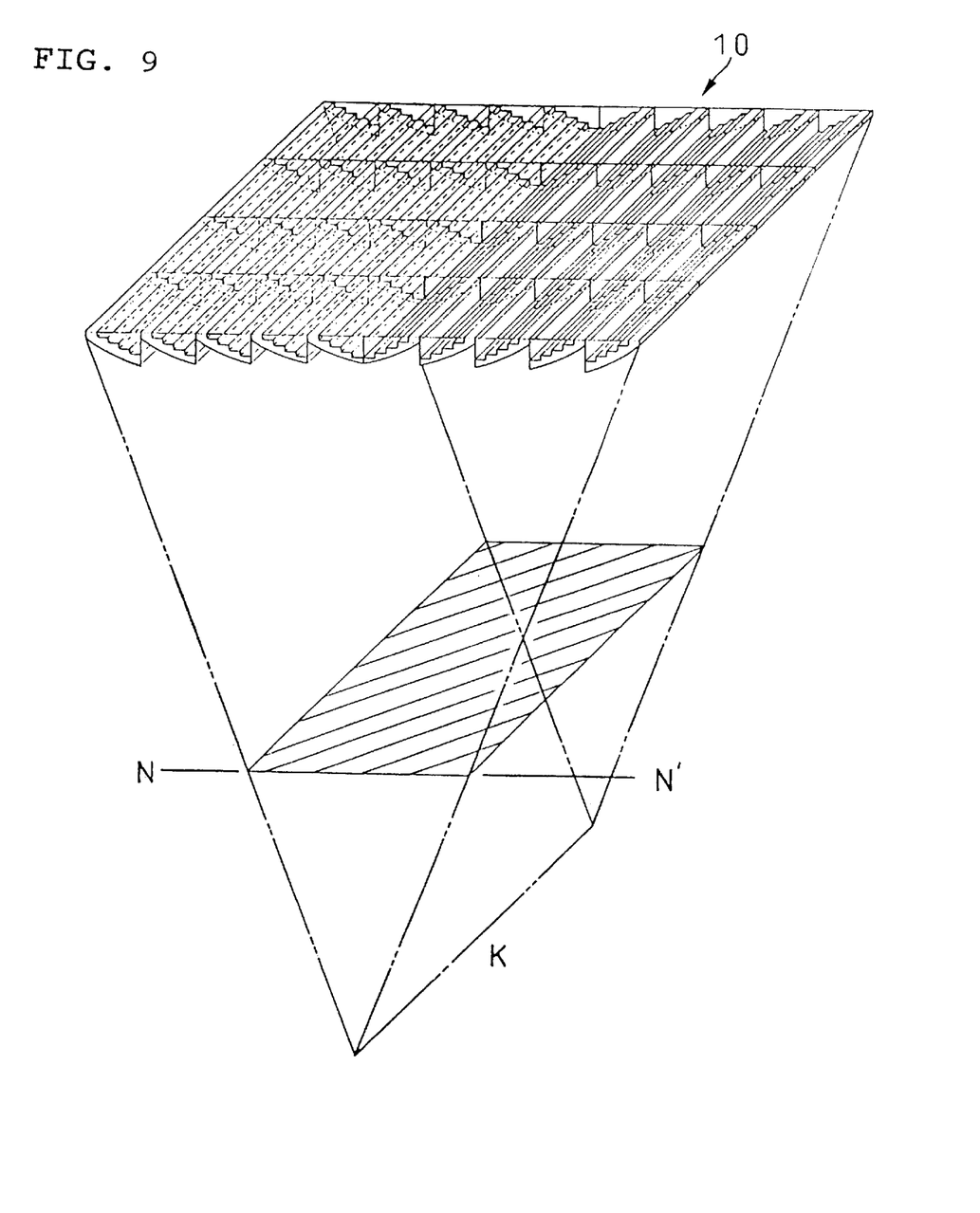
FIG. 9 is a perspective view of an embodiment of the discontinuous light-beam condenser lens according to the present invention.

As far as light beams refracted from lens segments can be condensed onto a single line, a combination of lens segments is not particularly limited. As mentioned above, there may be a case where light beams refracted from a plurality of lens segments are condensed onto a single line. In this case, if refracted light beams are received on an arbitrary surface before being condensed onto a single line, they are condensed on a surface within a predetermined range. For example, if refracted light beams are received on surfaces comprising N–N' line of the cross-sectional view shown in FIG. 8, the light beams incident upon the discontinuous light-beam condenser lens of the present invention are condensed on the shaded area in FIG. 9, so that high temperature and illumination intensity can be secured within this shaded area. The shaded area may be parallel with surfaces of the discontinuous light-beam condenser lens, otherwise it may be formed at a predetermined angle from the surfaces of the condenser lens. In this case, selections of temperature and illumination intensity can be made by adjusting the calculated lens segments, which makes it possible to secure an arbitrary area having a constant temperature.

The arrangement of the above lens segments is not limited to a square formation as shown in FIG. 8, but a wide variety of forms including a circular form, polygonal forms, or such a form devoid of the center portion, or checkered pattern, may be selected in consideration of desirable temperature range or in accordance with the form of an area to be heated.

Further, a plurality of the discontinuous light-beam condenser lenses according to the present invention can be utilized in combination. It is also possible to intersect the condensing lines. In this case, high temperature and illumination intensity can be generated on surfaces including the intersection of the light beams. Further, it is also possible that an arbitrary surface closer to the lens than the area in which condensing lines are concentrated receives refracted light. Further, in order that their condensing lines can be provided in parallel, it is also possible to dispose a plurality of the discontinuous light-beam condenser lenses according to the present invention. Thus, the arrangement of the lens is not particularly limited.

The thickness of the discontinuous light-beam condenser lens according to the present invention can be thinned down. Therefore, the condenser lens of the present invention is suitable for forming a large-scale condenser unit having strong wind-resistance and overcoming problems caused by rainwater and flying birds, and the like.

There has thus been shown and described a novel discontinuous light-beam condenser lens which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, and variations and other uses and applications which do not depart from the spirit and scope of the invention are deemed to be covered by the invention, which is to be limited only by claims which follow.

What is claimed is:

1. A discontinuous light-beam condenser lens formed by a combination of a plurality of lens segments, wherein each of said lens segments comprises:
    (a) a stair-like incident-light surface; and
    (b) a refractive surface functioning as a condensing curved surface, which is so formed that light beams passed through the refractive surface are condensed onto a single line.

2. The discontinuous light-beam condenser lens according to claim 1, wherein said plurality of lens segments are discontinuously linked together to form one plane.

3. A discontinuous light-beam condenser lens being so arranged that they can condense light beams onto a single line and formed by a combination of a plurality of lens segments, wherein each of said lens segments comprises;
    (a) a stair-like incident-light surface; and
    (b) a refractive surface functioning as a condensing curved surface, which is so formed that light beams passed through the refractive surface are condensed onto the single line.

* * * * *